April 17, 1951 — W. A. CALDWELL — 2,549,571
AIR VALVE, RELIEF VALVE, AND PRESSURE SIGNAL FOR PNEUMATIC TIRES
Filed March 30, 1949 — 2 Sheets-Sheet 1

William Addison Caldwell
Inventor

April 17, 1951  W. A. CALDWELL  2,549,571
AIR VALVE, RELIEF VALVE, AND PRESSURE SIGNAL
FOR PNEUMATIC TIRES
Filed March 30, 1949  2 Sheets-Sheet 2
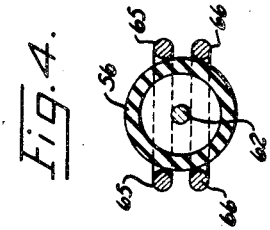
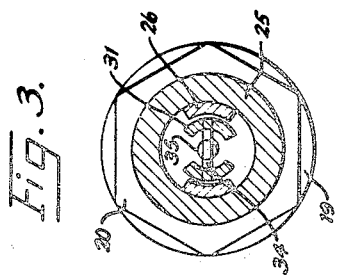
William Addison Caldwell
Inventor

UNITED STATES PATENT OFFICE 2,549,571

AIR VALVE, RELIEF VALVE, AND PRESSURE SIGNAL FOR PNEUMATIC TIRES

William Addison Caldwell, Leesburg, Tex.

Original application May 18, 1948, Serial No. 27,776. Divided and this application March 30, 1949, Serial No. 84,438

6 Claims. (Cl. 152—418)

This invention relates to pneumatic tires for vehicles. It has for its object to provide certain improvements in the construction of such tires, particularly the inner tube, primarily for the purpose of protecting it against excessive pressure at the time of inflation as well as in the course of ordinary operation.

A second purpose served by the invention is to provide an audible warning signal of a dangerous increase or decrease of pressure in regard to the normal operating limit.

To accomplish the aforesaid purposes, I provide a new type of valve mechanism for the inner tube located exteriorly thereto and operated by a power member located within the tube and actuated by changes in the air pressure therein adapted to determine automatically the amount of air pressure that can be and should be initially injected into the tube; to release excessive pressure from the tire as a final step in the circulation of air through it, when the said valve mechanism is used conjointly with a pressure and temperature equilibrator, or automatic inflation pump; and to give timely warning by means of an audible signal of any unusual increase in pressure or loss of pressure beyond the power of the equilibrator to compensate it.

To these and other ends, my invention comprises other improvements and advantages as will be fully described in the accompanying specification, the novel features thereof being set forth in the appended claims.

This application is a division of application Serial No. 27,776 filed May 18, 1948 and issued June 27, 1950 as Patent No. 2,512,766.

In the drawings:

Figure 3 is a cross section of the valve nipple taken on the line 3—3 of Figure 2.

Figure 4 is a cross section of the power member taken on the line 4—4 of Figure 2.

Figure 2:
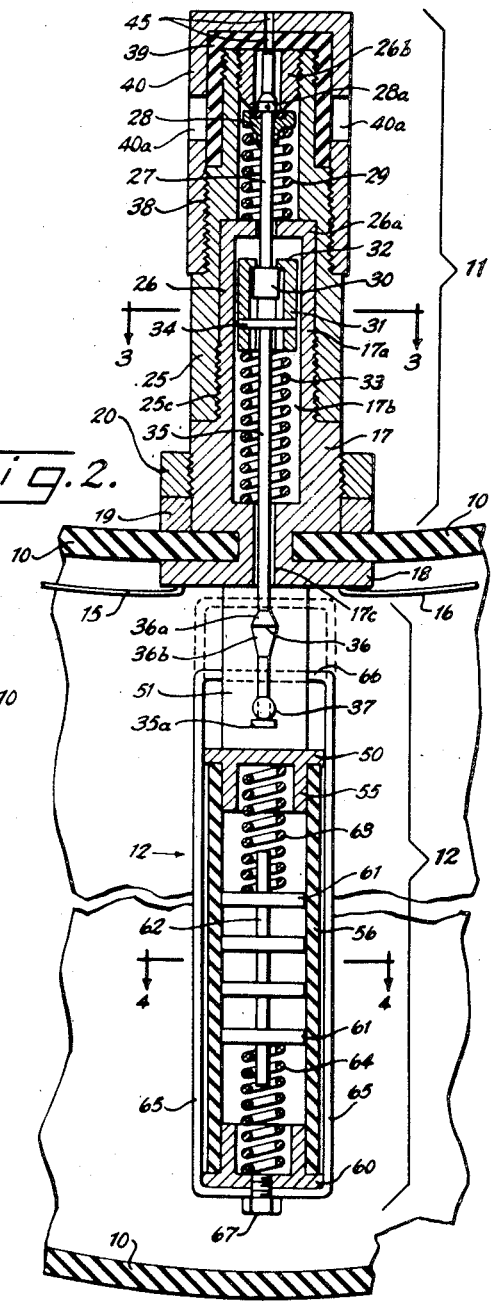
Figure 2 is an enlarged vertical section of the inlet air valve and power member taken on the same sectional plane as that of Figure 1.
Figure 5:
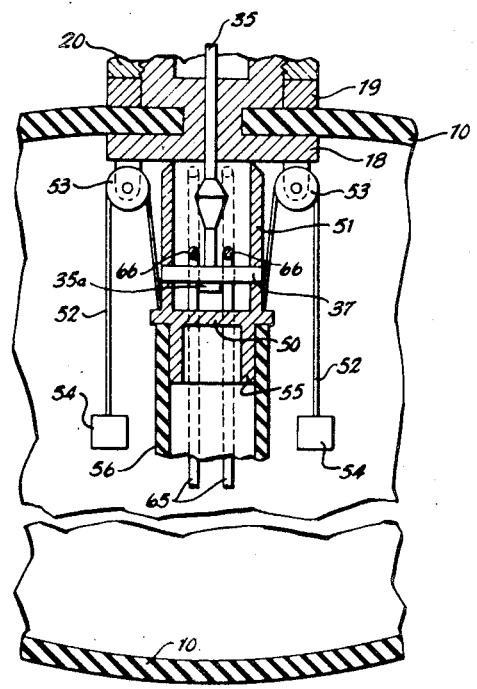

Figure 5 (Figure 8 on the accompanying photostat) is a fragmentary vertical section of the bottom of the inlet valve base, taken at right angles to Figure 2, showing the counterweights attached to said base.

Similar reference numerals in the several figures indicate similar parts.

Figure 1:
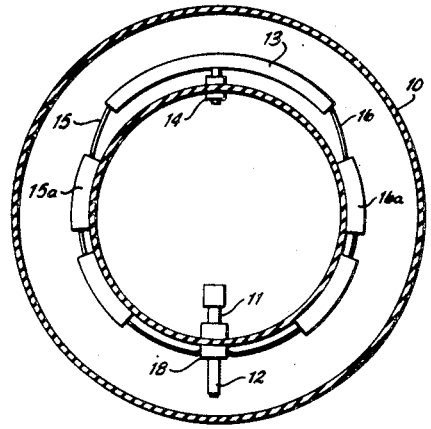
Figure 1 is a vertical section of an inner tube of a pneumatic tire, showing the same inflated, in which the several elements of my invention are illustrated as they appear in elevation.

In illustrating my invention, I have shown in Figure 1 only the air chamber or inner tube 10 of a pneumatic tire, which when inflated as shown, assumes the shape of a circular tube, which is also circular in cross section. At one point in the tube there is fixed externally the air inlet valve 11, and the associated internally located power member 12. Oppositely disposed within the tube is a pressure and temperature equilibrator indicated by the numeral 13, same being the subject of co-pending application No. 27,776. Intermediate the ends of the equilibrator, it is connected to the tube 10 by a nipple 14 having a valve controlled air inlet opening exteriorly of the tube. The equilibrator 13 has at its ends interior valves, which are connected by the flexible rods 15, 16, also located within the tube, to the flange 18 of the base of the first mentioned inlet valve. Each of these rods carries multiple weights 15a, 16a, which upon rotation of the wheel carrying the tire, are displaced by centrifugal force, and thus serve to actuate the equilibrator.

The specially constructed air inlet shown in Figure 2 comprises a tubular base 17 having at its interior end a flange 18 which engages the inner face of the tube 10, being inserted therein through a suitable aperture cut in the tube. The material of the tube surrounding the aperture is clamped against the flange 18 by collar 19 and compression nut 20. The outer end 17a of the base 17 is reduced in diameter and provided with a central chamber 17b which opens at its inner end into the tube 10 through a passage 17c. The base 17 is extended upwards by a hollow nipple 25 secured by threads 25c.

Beyond the threads 25c the side walls of the base 17 are cut away to form the arms 26 as shown in Figure 3. The upper ends of the arms are turned towards each other to form a shoulder 26a having a perforation in its middle center. The upper end of the nipple 25 extends beyond the top of the arms 26 and has a chambered passage, in the extremity of which is inserted a removable tubular screw threaded plug forming an annular valve seat 26b.

There is a valve stem 27 centrally located in the outer end of the nipple 25 carrying a head 28 provided with a rubber pad which is normally closed against the valve seat by a coil spring 29. The upper end of this spring engages the valve head, and its lower end engages the shoulder 26a. Extending outwardly from the center of the head 28 is a conical projection 28a removably secured to the stem 27, which being of lesser diameter than the valve seat opening, performs the dual purpose of securing the pad at the same time restricting the opening in the valve seat 26b when the head 28 is slightly disengaged from said seat. In order that the stem 27 may be retracted on occasion from within the tire to relieve an excessive pressure or to actuate an audible signal in case the pressure becomes subnormal, its lower end which extends into the chamber below the shoulder 26a is provided with a head 30.

Guided within the chamber 17b and between the arms 26 is a trip member 31 composed of two similar side pieces integrally connected at their outer ends by a perforated shoulder, through which the valve stem 27 projects. The trip member is slidably fastened by the head 30 to the valve stem, and the trip member is normally held in an outward inoperative position by a compression coil spring 33 located beneath it in the chamber of the base 17.

The lower ends of the trip member 31 carry a transverse pin 34, and depending therefrom is a rod 35, the lower end of which extends through the passage in the flange 18 of the valve stem into the air chamber of the inner tube 10 where it is provided with an enlargement 36 having upper and lower conical surfaces 36a, 36b, the former being located a short distance beneath the flange 18. The extremity of the rod 35 beyond the conical enlargement 36 is guided in a central perforation in a cross bar 37, and fastened to it by the head 35a.

With further reference to the air inlet valve, it will be observed that the nipple 25 is threaded exteriorly as indicated at 38, beyond which it is reduced in diameter and again threaded exteriorly to accommodate the connection cap of the usual air pump hose, by means of which air is introduced under pressure into the inner tube 10. A rubber cap 39 is stretched over the top of the nipple 25 and is enclosed by a retaining closure 40 which engages the threads 38. In line with the axis of the valve seat 26b, both the rubber cap and its retaining closure are provided with small alined perforations 45, and in the sides of the closure 40 are round apertures 40a. The perforations are for the purpose of permitting small quantities of air to escape on occasions when the valve head 28 is partially disengaged from its seat 26b, and the apertures 40a are for the purpose of allowing larger quantities of air to escape when said head has been retracted sufficiently to disengage the projection 28a from the valve seat aperture. The large quantity of air in escaping will rupture the side walls of the cap with a loud report that will serve as an audible signal.

Associated with the air inlet nipple and in alinement therewith, within the air chamber 10 of the tire is a power member comprising parts which are actuated by changes in the air pressure for retracting rod 35 to open the air inlet valve. The head piece 50 of this element has spaced upwardly extending arms 51, by means of which the power member is fastened to the cross bar 37. The upper ends of these arms are normally held in engagement with the inner or bottom face of the flange 18 by the compression spring 33. In order to counterbalance the effect of centrifugal force acting on the power member during the usual rotation of the associated wheel, which would otherwise tend to overcome the tension of the spring 33, I attach to the head 50 flexible cords 52, which are trained over pulleys 53 carried on bearing members attached to the bottom of flange 18, and I attach to the free ends of these cords suitable weights 54.

Projecting downward from the head piece 50 is an annular collar 55, to which is attached a short piece of rubber tubing 56 closed at its other end by a similar head 60. This tube is compressible lengthwise only, being braced against collapsing under air pressure by compression coil springs 63, 64, and a series of discs 61 formed integrally on a central stem 62, which discs also serve to adapt the tube to fold bellows-like under pressure. This longitudinally compressible member 56 is mounted in a rectangular cage composed of parallel sets of rods 65—65, 66—66 which extend under the head 60, and are attached thereto by a bolt 67. These rods extend past the head 50, which is guided for longitudinal movement thereon, and extend across said head at a point between the cross bar 37 and the conical enlargement 36 as indicated at 66. The normal distance between the cage members is only slightly greater than the diameter of the rod 35 which runs between their horizontal tops, but the resilient qualities of the cage members are sufficient to enable their horizontal tops to separate as the cage moves upward so that they will slide over the tapered surface 36b, and thus spring over the enlargement 36, whereby, when there is a loss of air pressure from the tire, and the cage is moved in the opposite direction, it will act to retract the valve head 28 from its seat 26b.

In the construction of the power member 12, the compressional tension of springs 63, 64 must be such as to allow the bottom 60 of the rubber member to be elevated until the top of the cage 65—65, 66—66 engages the bottom of the base 17 of the air inlet nipple with sufficient force to establish an equilibrium with the spring 33 at normal operating air pressure, plus a modicum sufficient to overcome said spring when the pressure is raised above normal and open the inlet valve 28, thus allowing the excess pressure to escape.

To further explain the operation of the power member 12, since after the top of the cage 65—65, 66—66 has reached the bottom of the base 17 of the valve nipple, the rubber element will still be susceptible of further compression; and since the bottom end 60 of the power member can not move any farther upward, the top end 50 must move downward, overcoming the opposition of the spring 33 and pulling open the inlet valve 28. And as long as this valve is held open, it will be impossible to force more air into the tire with a hand or power pump, because the compressed air will follow outwardly the piston of the pump, thereby preventing the inflow of air from the outside at atmospheric pressure.

In this connection, it should be observed that normally, the power member 12 is suspended by its upper end from the rod 35, in which position it will continue after the tire has been inflated to or beyond its normal operating pressure. But when the tire begins to lose pressure, thereby allowing the power member to expand, since its top end can not move upward, its bottom end must move downward. And when by this downward movement the top of the cage 65—65, 66—66 is brought in engagement with the enlargement 36 on the rod 35, the power member will no longer be suspended by its upper end, but by the top of the cage 65—65, 66—66, in which position it will continue until the head 35a on the rod 35 is drawn downward far enough to engage the upper or outer face of the head 50, when the top of the cage 65—65, 66—66 will slip over the enlargement 36, thus allowing the power member to regain its normal position.

The operation of my invention as a whole is as follows:

Beginning with an empty tire, the retaining closure 40 and the rubber cap 39 are removed and the air pump is connected to the neck of the nipple 25. As air is pumped into the inner tube in the usual way, the increasing pressure will compress the rubber element 56 and the springs 63, 64 of the power member 12, thereby forcing upward the lower end 60 thereof until the top of the cage 65—65, 66—66 in which the power member is mounted engages the flange 18 of the nipple base. Thereafter, any further increase in pressure will cause the top of the power member 12, until now held against the nipple base or flange 18 by the spring 33, to move downward, thereby retracting the rod 35 and disengaging the head 28 of the air inlet valve from its seat, when air will begin to retrogress from the inner tube 10 and stop the pump from functioning. Or if the tire is filled from a tank, upon removal of the hose nozzle from the neck of the valve nipple 25, air will escape from the inner tube 10 until the pressure has been reduced sufficiently to allow the top of the power member 12 to regain its normal position in engagement with the flange 18 of the nipple base, when the valve head 28 will also regain its normal position and close the valve. The same result would follow an increase of pressure in a normally inflated tire, whether caused by an equilibrator, atmospheric changes, or friction against the roadbed.

After the tire has been duly inflated to its normal operating capacity, predetermined by the power member 12 in the manner above described, and the rubber cap 39 and retaining closure 40 restored to their usual position, any loss of pressure by leakage or otherwise will cause the lower end of the power member 12 to recede from its elevated operating position until the top of the cage 65—65, 66—66 engages the enlargement 36 on the rod 35 which will then be retracted, thereby disengaging the valve head 28 from its seat, and finally opening the valve completely, whereupon, air will escape from the inner tube through the canal 17c in the base of the inlet valve nipple in sufficient quantity to rupture the rubber cap 39, thereby producing an audible warning signal. Air will continue to escape through the nipple and the bottom of the power member 12 will continue to move downward until the end of the rod 35 engages the top of the head 50, when the cage 65—65, 66—66 will be forced to release its hold on the enlargement 36 by springing over it, thus allowing the spring 33 as well as the top 50 of the power member and the valve head 28 to regain their normal position, thereby closing the valve to prevent the needless loss of air through the nipple after the warning signal has been sounded.

Any increase of pressure above the normal operating point, generally will but partially open the valve 28, while a loss of pressure because of a continuous leakage will invariably open the valve completely.

I claim:

1. The combination with a pneumatic tire having an air inlet stem provided with a valve seat, a spring operated valve head engaging the seat, and a release rod in said stem cooperating with said valve head and having a radially outer end extending into the tire, of a power member within the tire comprising two relatively movable heads, one of which is positioned in contact with the radially outer end of the air inlet stem, said member being capable of contracting and expanding with changes of air pressure within the tire to vary the position of its movable parts with relation to said valve stem, and means operated by the movement of said heads and cooperating with the radially outer end of the release rod for actuating it to release the valve head upon the development of an excessive pressure of air in the tire, or a substantial loss of pressure therefrom.

2. The combination with a pneumatic tire having an air inlet stem provided with a valve seat, a spring operated valve head engaging the seat, a release rod in said stem cooperating with the valve head and having a radially outer end extending into the tire, and a spring holding the rod retracted which is set in accordance with a given tire pressure, of a power member within the tire suspended on the radially outer end of the retracting rod and held by the last mentioned spring in engagement with the radially outer end of the inlet stem, said power member comprising a flexible tube, heads thereon, and resilient means normally holding them in spaced relation in accordance with a given tire pressure, means operated by one of the heads acting under such pressure for tripping engagement with the retracting rod, the other end serving upon a lessening of the pressure in the tire also to cause said means to retract the rod.

3. In combination with a radially inner tube of a pneumatic tire, an air inlet stem having a valve seat and a movable valve head, a release rod for said head projecting into the radially inner tube, and a power member within the inner tube capable of contraction and expansion under changes in air pressure occurring within the tube, operating connections between it and said retracting rod for disengaging the valve head from its seat, weights attached to the radially inner head of the power member by flexible cords trained over pulleys attached to the radially outer end of the inlet valve stem to counterbalance the effect of centrifugal force acting on the power member during the rotation of the wheel with which it may be associated.

4. The combination with a pneumatic tire having an air inlet stem provided with a valve seat, a valve head normally engaging with the said seat, a cap enclosing the outer end of the valve stem capable of rupture having an air vent in its top to protect it against rupture by a small quantity of air under pressure escaping from the tire through the valve stem, a retaining closure having an air vent in alinement with the one in the cap and apertures in its sides to allow the rupture of the cap and limit the extent of the rupture by air under pressure escaping from the inner tube through the valve stem in excess of the capacity of the air vent to discharge it, and a rod for releasing the valve head having a radially outer end projecting into the tire provided with a bulbous enlargement, of a power member within the tire suspended on the releasing rod having a head normally held thereby in engagement with the radially outer face of the base of the inlet stem, said power member also comprising a flexible tube attached to said head and connected to a second head having within it resilient means set to hold the heads spaced in accordance with a given tire pressure, means carried by the power member and operated by said pressure into actuated position with reference to the bulbous enlargement, whereby upon decreasing of said pressure the said releasing rod will be retracted to unseat the valve head.

5. The combination with a pneumatic tire having an air inlet stem provided with a valve seat, a valve head normally engaging with said seat, a sheath enclosing the outer end of the valve stem, capable of rupture having an air vent in its top to protect it against rupture by a small quantity of air under pressure escaping from the tire through the valve stem, a retaining closure having an air vent in alinement with the one in the cap and apertures in its sides to allow the rupture of the cap and limit the extent of the same by air under pressure escaping from the inner tube through the valve stem in excess of the capacity of the air vent to discharge it, a release rod projecting from the valve head into the tire provided with a bulbous enlargement, of a power member within the tire suspended on the releasing rod having a head normally held thereby in engagement with the radially outer end of the air inlet stem, said power member comprising a flexible tube attached to said head by one end and attached to a second head by the other end having within it a series of discs formed integrally on a central stem interposed between two springs set to hold the heads spaced in accordance with a given tire pressure adapting the said flexible tube to fold bellows-like under the said pressure.

6. In combination with a radially inner tube of a pneumatic tire, an air inlet step having a valve seat and a movable valve head, a conical projection extending radially inward from the valve head and fitting slidably in the opening in the valve seat, and a release rod cooperating with the valve head and extending into the chamber of the inner tube, a power member within the tube capable of contraction and expansion under changes of air pressure occurring within the tube, and operating connections between the power member and said rod for disengaging the valve head from its seat.

WILLIAM ADDISON CALDWELL.

REFERENCES CITED

The following references are of record in the file of this patent:

UNITED STATES PATENTS

| Number | Name | Date |
|---|---|---|
| 1,303,893 | Haskins et al. | May 20, 1919 |
| 1,894,908 | Hopkins | Jan. 17, 1933 |
| 1,930,041 | Crowley et al. | Oct. 10, 1933 |